Patented Mar. 4, 1930

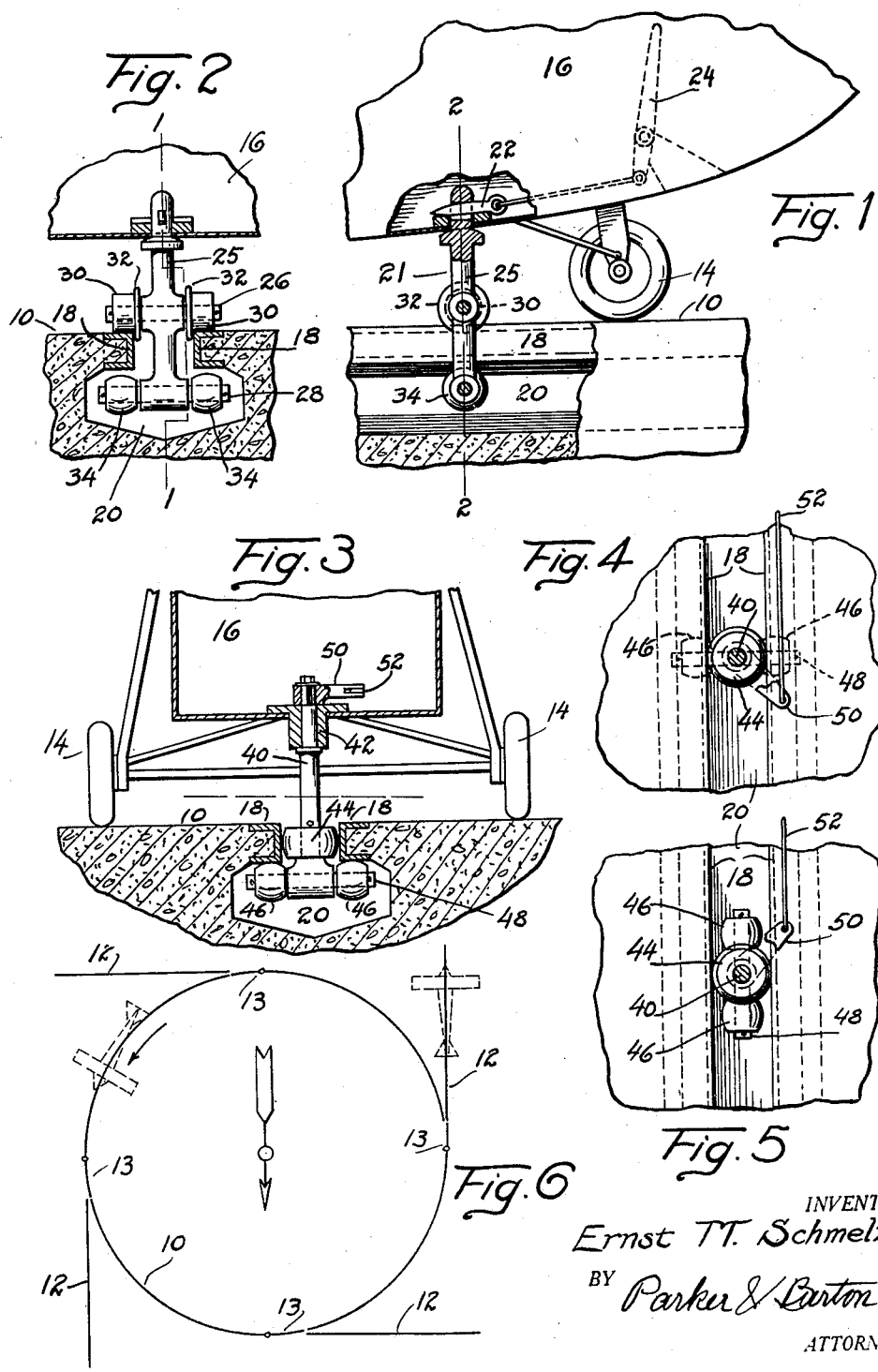

1,749,357

UNITED STATES PATENT OFFICE

ERNST M. SCHMELZ, OF DETROIT, MICHIGAN

AIRCRAFT-LAUNCHING APPARATUS

Application filed August 2, 1926. Serial No. 297,001.

My invention relates to improved apparatus for facilitating the launching of aircraft.

In the launching of self-propelled, heavier than air aircraft, it is common practice for the machine to travel across the field in the desired direction under its own power until sufficient momentum is attained to enable it to rise from the ground. This may be along a predetermined path and generally into the wind. My invention has to do with the provision of means to facilitate this end.

An object resides in the employment of a trackway upon which the ground wheels of the aircraft may travel, which trackway is preferably circular and has arranged at different points thereabout switch trackways extending tangentially thereto so that an aircraft traveling about the circular trackway may depart therefrom upon any of the tangentially arranged switch trackways so as to come into the air in the desired direction.

A meritorious feature consists in providing such trackway with a suitable guide rail over which a carriage structure carried by the aircraft may travel to hold the aircraft to travel upon the trackway until the carriage is released by the operator and the structure may be such that the carriage releasably engages the rails to be detached therefrom or is permanently coupled with the rail and releasably engages the craft to be disconnected therefrom. The switch trackways are provided with guide rails and switch mechanism is employed to establish communication between the switch guide rails and the circular guide rail of the circular trackway.

Other objects, advantages and meritorious features of my invention will more fully appear from the following description, appended claims and accompanying drawing, wherein:

Fig. 1 is a fragmentary elevation partly in section along line 1—1 of Fig. 2 of apparatus embodying my invention.

Fig. 2 is a cross-sectional view taken on line 2—2 of Fig. 1.

Fig. 3 is a horizontal fragmentary sectional view through an aircraft and trackway showing apparatus of a modified form embodying my invention.

Figs. 4 and 5 are fragmentary plan views of the trackway shown in Fig. 3 with the carriage arranged with respect to the guide rails so that in Figure 4 it is coupled therewith and in Fig. 5 it is being released therefrom.

Fig. 6 is a plan of my improved trackway.

In working out my invention I employ preferably a circular trackway indicated in Fig. 6 in diagram as 10 and having arranged at intervals thereabout tangentially positioned switch trackways 12. This trackway is adapted to serve as a runway for an aircraft when taxying over the ground and in Fig. 3 there appears an enlarged view where the trackway is indicated as 10 and supporting the ground wheels 14 of an aircraft generally indicated as 16.

The trackway is provided with a pair of guide rail members 18 which are here shown embedded in the trackway at its normal level and provided with a well 20 extending therealong underneath the rails, said rails being spaced apart as indicated in Fig. 3. These rails preferably extend throughout the length of the trackway along the midline thereof.

These guide rails extend throughout the circular trackway and also along the length of the switch trackways 12, and switch mechanism 13 which is manually operable are provided to place the guide rails of any particular switch trackway in communication with the guide rails of the circular trackway in any suitable manner well known to this art.

The aircraft, of any conventional type, is indicated as 16, and a carriage is indicated generally as 21. In Figs. 1 and 2 this carriage is shown depending from the bottom of the craft and coupled therewith by a drawbar 22 adapted to be actuated by a hand lever 24 by the operator of the craft to release the carriage.

In Figs. 1 and 2 the carriage is shown as secured between the guide rails 18 to travel thereover and is illustrated as comprising an upright frame 25 having vertically spaced apart horizontally extending arms 26 and 28. The arms 26 carry rollers 30 which rest upon the upper surface of the guide rails and which have flanges 32 to position the carriage between the guide rails. The lower arms 28 carry rollers 34 which travel underneath the guide rails and prevent the carriage being lifted therefrom thereby holding the ground wheels 14 of the aircraft to travel over the tackway in the travel of the craft thereover. In this type of construction the carriage is released from the craft as hereinabove described.

In Figs. 3 to 5 inclusive the carriage forms a permanent part of the aircraft and is released from its traveling connection with the guide rails 18. In this type of construction there is provided a shaft 40 journaled in a bearing 42 as indicated in Fig. 3 and carrying at its lower end a roller 44 arranged in a horizontal plane to travel between the guide rails 18 and a pair of rollers 46 mounted upon opposite ends of a support 48 to travel underneath the guide rails.

The shaft 40 is provided with an arm 50 at its upper end to which is attached a tension element 52 which may be a tension element corresponding to that shown in Fig. 1 as connecting the lever 24 with the drawbar 22 so that upon its actuation the shaft 40 is rotated through an arc of 90° to bring the rollers 46 into the position shown in Fig. 5 to permit their withdrawal through the space between the guide rails and the consequent disconnection therefrom.

With my improved device an aircraft may travel about my circular trackway until sufficient momentum is obtained to permit it to easily leave the ground and it then may be shoved off on to one of the switch trackways so that if desired it may enter the air substantially into the wind. The switch controls may be regulated from the ground and the operator of the craft has complete control from the rails of the carriage and the craft will not leave the ground until the operator decides that its acquired momentum is sufficient. Obviously the carriage might be provided with power mechanism to propel it or to increase its propulsion over the effort exerted thereon by the power plant of the aircraft.

What I claim is:

1. In launching apparatus for an aircraft, a circular trackway for the ground wheels of an aircraft provided with a guide rail extending substantially along the midline thereof, and a plurality of switch trackways extending tangentially in different directions from the circular trackway, each switch trackway provided with a correspondingly located guide rail having a switch connection with the guide rail of the circular trackway.

2. In launching apparatus for an aircraft, a circular trackway for the ground wheels of an aircraft provided with a guide rail extending therealong, a plurality of switch trackways extending relatively to the four points of the compass tangentially with respect to the circular trackway, each switch trackway provided with a guide rail corresponding to the guide rail of the circular trackway and having a switch controlling its communication therewith.

3. In launching apparatus for an aircraft, a circular trackway for the ground wheels of an aircraft provided with a guide rail extending therealong, a plurality of switch trackways extending tangentially therefrom in different directions, each switch trackway provided with a guide rail corresponding to the guide rail of the circular trackway and switch mechanism to establish communication therewith, and a carriage carried by the aircraft and coupled with said guide rail to travel thereover to hold the aircraft to travel over the trackway.

4. Launching apparatus for an aircraft comprising, in combination, a self-propelled aircraft having ground wheels, a trackway for said wheels to travel over in the launching of the craft under its own power provided with a guide rail extending therealong, a switch trackway provided with a switch guide rail extending away from the first mentioned trackway, a switch controlling the same, a carriage detachably connected with the aircraft to be carried thereby and coupled with said guide rail to travel thereover, and manually operable means controlling said detachable connection.

5. Launching apparatus for an aircraft comprising, in combination, a self-propelled aircraft having ground wheels, a circular trackway for said wheels to travel over in the launching of the craft under its own power, said trackway provided with a guide rail extending therealong, switch trackways provided with switch guide rails extending in various directions tangentially from the circular trackway, and a carriage detachably connected with the aircraft to be carried thereby and coupled with said guide rail to travel thereover to hold the aircraft to travel over the trackway, and manually operable means to release said detachable connection.

6. Launching apparatus for an aircraft comprising, in combination, a self-propelled aircraft having ground wheels, a trackway for the travel of the ground wheels for the launching of the craft provided with a pair of spaced apart guide rails embedded in the trackway and extending substantially along the midline thereof and a carriage carried by the craft having parts engaged between and underneath the rails to travel thereover and to hold the craft to travel over the trackway, and manually controlled mechanism operable to swing said parts to pass out between the rails to release the carriage therefrom.

In testimony whereof, I, ERNST M. SCHMELZ, sign this specification.

ERNST M. SCHMELZ.